(12) United States Patent
Shiu et al.

(10) Patent No.: US 10,141,030 B2
(45) Date of Patent: Nov. 27, 2018

(54) UNLOADING MECHANISM ASSEMBLY (71) Applicant: Wistron Corporation, New Taipei (TW)

(72) Inventors: Meng-Chian Shiu, New Taipei (TW); Chi-Jen Lo, New Taipei (TW); Jhih-Ming Chen, New Taipei (TW); Chia-Hsiung Hsueh, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/673,421

(22) Filed: Aug. 10, 2017

(65) Prior Publication Data
US 2018/0261259 A1    Sep. 13, 2018

(30) Foreign Application Priority Data

Mar. 13, 2017 (TW) .............................. 106108105 A (51) Int. Cl.
| | |
|---|---|
| *G11B 17/056* | (2006.01) |
| *G11B 33/12* | (2006.01) |
| *G06F 1/16* | (2006.01) |
| *F16M 13/02* | (2006.01) |

(52) U.S. Cl.
CPC ........... *G11B 33/124* (2013.01); *F16M 13/02* (2013.01); *G06F 1/1658* (2013.01)

(58) Field of Classification Search
None
See application file for complete search history.

(56) References Cited

U.S. PATENT DOCUMENTS

| | | | | |
|---|---|---|---|---|
| 5,305,180 A | * | 4/1994 | Mitchell | ............... G06F 1/1616 |
| | | | | 361/679.37 |
| 5,852,546 A | * | 12/1998 | Radloff | ................... G06F 1/184 |
| | | | | 361/679.39 |
| 6,643,139 B2 | | 11/2003 | Tien | |
| 7,679,899 B2 | | 3/2010 | Hsieh et al. | |
| 2002/0071254 A1 | | 6/2002 | Tien | |
| 2010/0031279 A1 | | 2/2010 | Hsieh et al. | |

FOREIGN PATENT DOCUMENTS

| | | | | |
|---|---|---|---|---|
| TW | | 484047 | 4/2002 | |
| TW | | I341452 | 5/2011 | |
| WO | WO-8304132 A1 | * | 11/1983 | ......... G11B 17/0407 |

OTHER PUBLICATIONS

"Office Action of Taiwan Counterpart Application," dated Sep. 20, 2017, p. 1-p. 6.

* cited by examiner

*Primary Examiner* — William J Klimowicz
(74) *Attorney, Agent, or Firm* — JCIPRNET (57) ABSTRACT

An unloading mechanism assembly adapted to unload an optical disk drive from a housing of an electronic device includes a guiding component, a push rod and a driving module. The guiding component is disposed at a side of the optical disk drive along a first direction and has a first position limiting slot extending along a second direction, perpendicular to the first direction. The push rod is disposed in parallel with the guiding component along the first direction. The driving module is coupled between the guiding component and the push rod and includes a driving rod movably disposed through the first position limiting slot along a third direction, respectively perpendicular to the first and the second directions. The push rod is adapted to drive the driving module to pivotally rotate with respect to the guiding component.

16 Claims, 11 Drawing Sheets

UNLOADING MECHANISM ASSEMBLY

CROSS-REFERENCE TO RELATED APPLICATION

This application claims the priority benefit of Taiwan application serial no. 106108105, filed on Mar. 13, 2017. The entirety of the above-mentioned patent application is hereby incorporated by reference herein and made a part of this specification.

BACKGROUND OF THE INVENTION

Field of the Invention

The invention relates to an unloading mechanism assembly and particularly relates to an unloading mechanism assembly of an optical disk drive.

Description of Related Art

Unloading or replacing an optical disk drive of a conventional notebook computer requires the assistance of a variety of tools or configuration of a variety of buttons. For example, most designs of an optical disk drive unloading mechanism of the conventional notebook computers include positioning and exiting mechanisms, such as connecting rods or latches. The above mechanical design usually requires a variety of operation buttons, such as a locking button or an unloading button. In order to dispose the various operation buttons, a plurality of openings need to be additionally provided on a bottom surface or a side surface of a housing of a notebook computer to accommodate the buttons. However, when a notebook computer with special specifications, such as those designed for industrial use, field use or military use, is manufactured, and a waterproof capability of the notebook computer needs to be reinforced, excess buttons or openings may increase the risk of permeation of external moisture leakage into the device. Therefore, in manufacturing of the notebook computer with special specifications, it remains an issue for people having ordinary skills in the art to effectively reduce the number of corresponding openings and buttons provided on the surface of the notebook computer and suppress the use of relevant disassembly tools during mounting and unloading of an optical disc drive, so as to unload the optical disk drive single-handedly to reduce the risk of permeation of moisture into the housing of the notebook computer, thereby coping with the needs for use in extreme environments.

SUMMARY OF THE INVENTION

The invention provides an unloading mechanism assembly, enabling a user to replace an optical disk drive by driving with a single handle.

The unloading mechanism assembly of the invention is adapted to unload the optical disk drive from a housing of an electronic device. The unloading mechanism assembly includes a guiding component, a push rod and a driving module. The guiding component is disposed at a side of the optical disk drive along a first direction and has a first position limiting slot. The first position limiting slot extends along a second direction and is perpendicular to the first direction. The push rod is disposed in parallel with the guiding component along the first direction. The driving module is coupled between the guiding component and the push rod. The driving module includes a driving rod movably disposed through the first position limiting slot along a third direction, respectively perpendicular to the first direction and the second direction. The push rod is adapted to drive the driving module to pivotally rotate with respect to the guiding component, so as to drive the driving rod to enter or to exit the first position limiting slot.

In an embodiment of the invention, the unloading mechanism assembly further includes a stroke limiting pedestal. The stroke limiting pedestal is disposed between the guiding component and the driving module and fixed to the housing. The stroke limiting pedestal has a first surface and a second surface opposite to each other and a position limiting groove disposed through the first surface and the second surface. The first surface faces toward the guiding component and an opening direction of the position limiting groove is parallel to the third direction.

In an embodiment of the invention, the position limiting groove has a first end and a second end opposite to each other, and a groove depth of the position limiting groove increases from the first end to the second end.

In an embodiment of the invention, the position limiting groove is an arc-shaped position limiting groove disposed through a portion of the stroke limiting pedestal.

In an embodiment of the invention, the driving module further includes a rotating pedestal and a rotating disk. The rotating pedestal is coupled to the push rod along the third direction. The rotating disk is disposed on the rotating pedestal. The driving rod is movably disposed sequentially through the rotating pedestal, the rotating disk, the position limiting groove and the first position limiting slot along the third direction. The driving rod has a first annular projection portion separately abutting against the second surface.

In an embodiment of the invention, the unloading mechanism assembly further includes an elastic member. The elastic member is disposed on the driving rod and abuts against the rotating pedestal and the rotating disk.

In an embodiment of the invention, the driving rod further has a second annular projection portion abutting against the rotating disk. The elastic member abuts against the second annular projection portion and the rotating pedestal.

In an embodiment of the invention, the driving module further includes an axle body and a torsion spring. The axle body is disposed on the rotating disk and extends along the third direction, and the torsion spring is disposed on the axle body.

In an embodiment of the invention, the guiding component further has a guide rail. The guide rail is disposed at a side of the first position limiting slot and extends along the first direction.

In an embodiment of the invention, the guide rail has a flat portion and an inclined portion. The flat portion extends along the first direction to an end of the guiding component. The inclined portion is disposed between the first position limiting slot and the flat portion and inclined to the flat portion.

In an embodiment of the invention, the push rod has a second position limiting slot disposed along the second direction. The driving module slidably disposed on the second position limiting slot.

In an embodiment of the invention, the push rod has a third position limiting slot disposed on the housing along the first direction.

In an embodiment of the invention, the unloading mechanism assembly further includes a position limiting screw-locking member. The position limiting screw-locking member is disposed through the third position limiting slot along the second direction to movably screw-lock the push rod to the housing. The push rod is adapted to slide along the first direction with respect to the position limiting screw-locking member and the housing via the third position limiting slot.

In an embodiment of the invention, the guiding component has lock holes, and the guiding component is locked to a side of the optical disk drive through the lock holes.

In an embodiment of the invention, the housing has a position limiting structure. The position limiting structure is disposed at a side of the push rod and extends along the first direction. The limiting structure has a position limiting rib. The position limiting rib extends toward the third direction and abuts against the push rod.

In an embodiment of the invention, the housing has a slide rib. The slide rib is disposed on the housing and corresponds to a bottom of the push rod.

In an embodiment of the invention, the unloading mechanism assembly further includes a button. The button is connected to an end of the push rod.

Based on the above, in several embodiments of the invention, the unloading mechanism assembly has the guiding component locked to the optical disk drive and the push rod, the driving module and the stroke limiting pedestal configured to push the optical disk drive. The push rod may drive the driving module to pivotally rotate, and the driving rod of the driving module may slide along the position limiting groove of the stroke limiting pedestal. The stroke limiting pedestal may press the first annular projection portion of the driving rod to drive the driving rod to move in a direction away from the guiding rod and the optical disk drive, so that one end of the driving rod disposed through the guiding component exits the first position limiting slot. A structure interference between the driving module, the guiding component and the optical disk drive may be removed accordingly to allow the user to unload the optical disk drive from the housing. In several embodiments of the invention, the optical disk drive is able to be completely unloaded only by driving of the push rod. Thus, the components and openings correspondingly required on the housing of the electronic device are effectively reduced, and the overall waterproof capability of the electronic device is enhanced.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
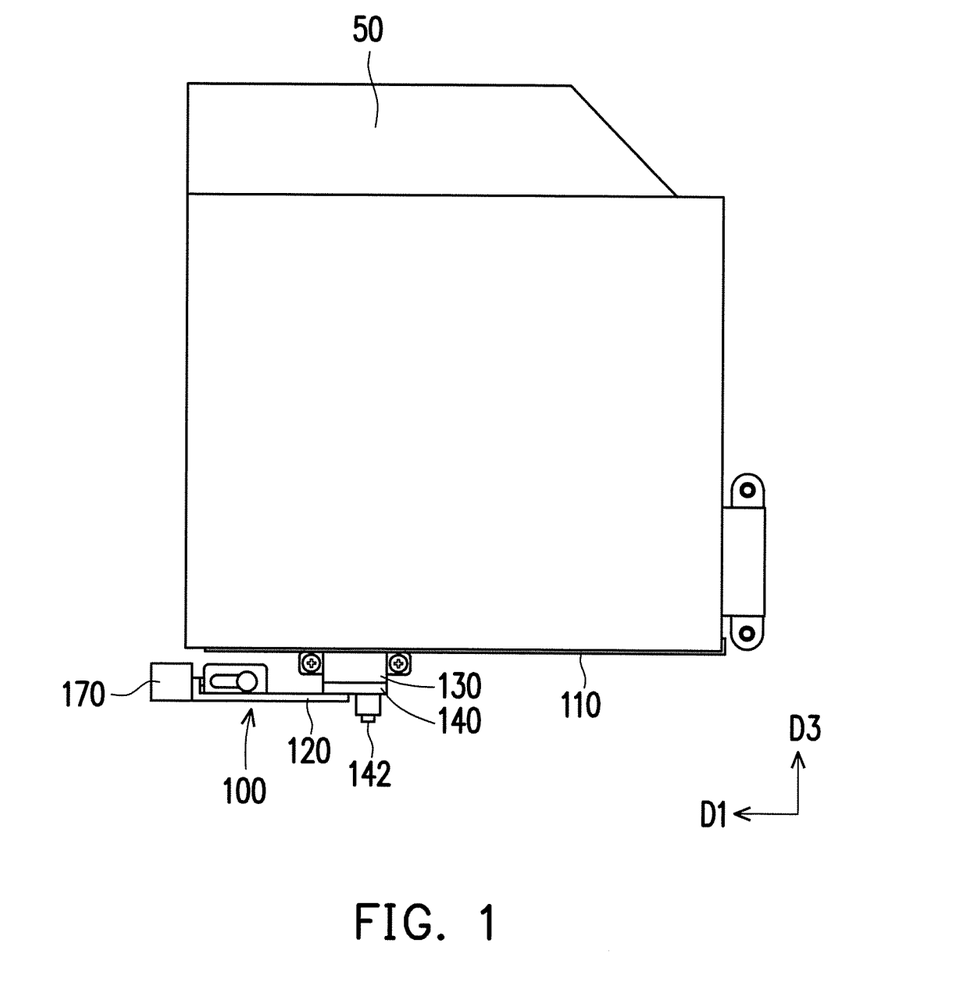
FIG. 1 is a top schematic view of an optical disk drive and an unloading mechanism assembly according to an embodiment of the invention.
Figure 2:
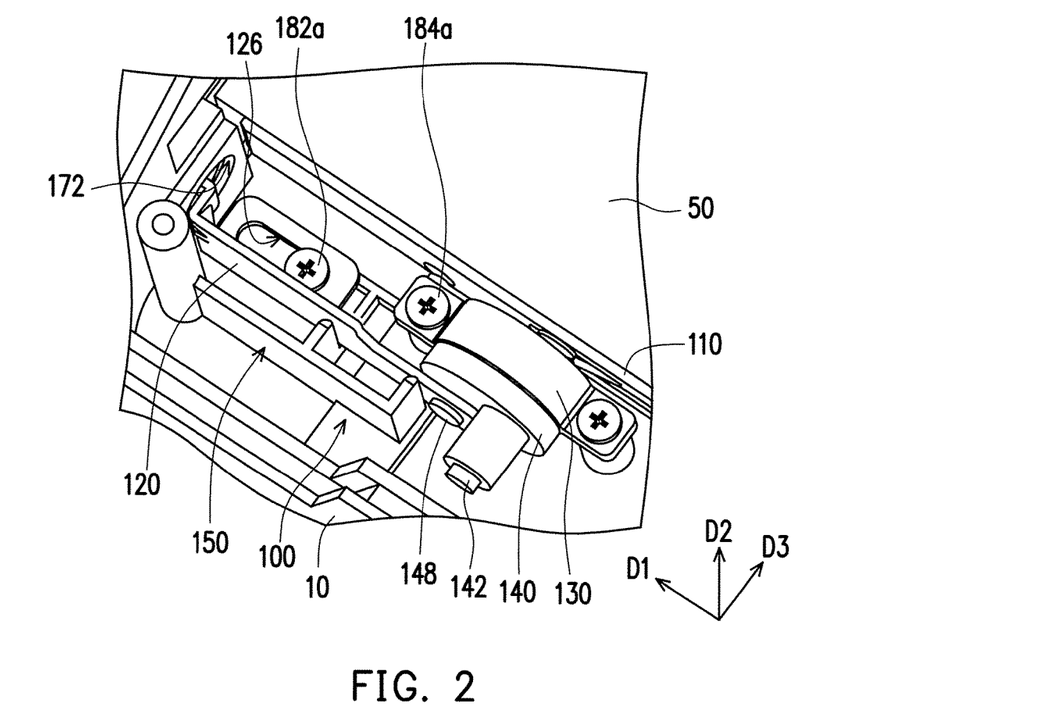
FIG. 2 is a side schematic view of an optical disk drive, an unloading mechanism assembly and a housing of an electronic device according to an embodiment of the invention.
Figure 3:
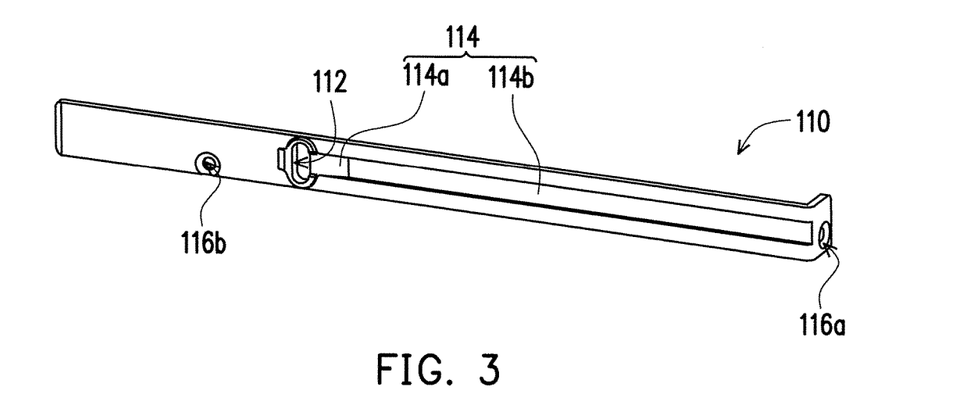
FIG. 3 is an enlarged schematic view of a guiding component of the unloading mechanism assembly of FIG. 1.

FIG. 1 is a top schematic view of an optical disk drive and an unloading mechanism assembly according to an embodiment of the invention. FIG. 2 is a side schematic view of an optical disk drive, the unloading mechanism assembly and a housing of an electronic device according to an embodiment of the invention. FIG. 3 is an enlarged schematic view of a guiding component of FIG. 1. Referring to FIG. 1 and FIG. 2, in the embodiment, an unloading mechanism assembly 100 is adapted to unload an optical disk drive 50 from a housing 10 of the electronic device. The unloading mechanism assembly 100 includes a guiding component 110, a push rod 120 and a driving module 140. In the embodiment, the electronic device is, for example, a notebook computer. As shown in FIG. 1, the guiding component 110 is disposed at a side of the optical disk drive 50 along a first direction D1. In addition, as shown in FIG. 2 and FIG. 3, the guiding component 110 has a first position limiting slot 112. The first position limiting slot 112 extends along a second direction D2 shown in FIG. 2, and the second direction D2 is perpendicular to the first direction D1. In FIG. 2, the push rod 120 is disposed in parallel with the guiding component 110 along the first direction D1. Further, the driving module 140 is coupled between the guiding component 110 and the push rod 120.

As shown in FIG. 2 and FIG. 3, the driving module 140 includes a driving rod 142 movably disposed through the first position limiting slot 112 of the guiding component 110 shown in FIG. 3 along a third direction D3. The third direction D3 is respectively perpendicular to the first direction D1 and the second direction D2. In the embodiment, the push rod 120 may move forward or backward along the first direction D1 in FIG. 2 to drive the driving module 140 to pivotally rotate with respect to the guiding component 110. In the present embodiment, the push rod 120 is driven by the driving module 140 to drive the driving rod 142 to enter or to exit the first position limiting slot 112 along the third direction D3 in FIG. 2.

As shown in FIG. 3, the guiding component 110 further has a guide rail 114 disposed at a side of the first position limiting slot 112 and extending along the first direction D1 to an end of the guiding component 110. Further, the guiding component 110 has a flat portion 114b and an inclined portion 114a. The flat portion 114b extends along the first direction D1 in FIG. 2 to an end of the guiding component 110. In the embodiment, when the optical disk drive 50 is disposed into the housing 10, the guiding component 110 may provide guidance on a movement path and a direction of the optical disk drive 50 inside the housing 10 via the flat portion 114b.

Referring to FIG. 3 again, the inclined portion 114a is disposed between the first position limiting slot 112 and the flat portion 114b, and the inclined portion 114a is inclined with respect to the flat portion 114b at 30 degrees to 45 degrees, for example. In the embodiment, the guiding component 110 has lock holes 116a and 116b, and the guiding component 110 is locked to a side of the optical disk drive 50 through the lock holes 116a and 116b.

Figure 4:
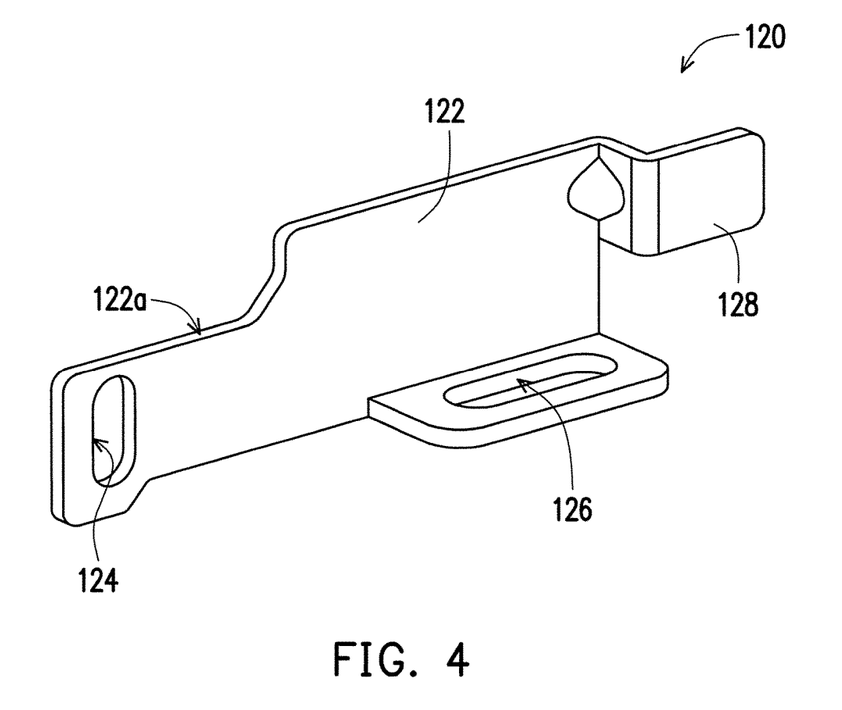
FIG. 4 is an enlarged schematic view of a push rod of the unloading mechanism assembly of FIG. 1.

FIG. 4 is an enlarged schematic view of a push rod of the unloading mechanism assembly of FIG. 1. Referring to FIG. 1, FIG. 2 and FIG. 4, the push rod 120 is disposed in parallel with a side of the guiding component 110 and extends along the first direction D1 from an outside of the housing 10 into the housing 10. As shown in FIG. 1 and FIG. 4, the push rod 120 has a second position limiting slot 124 disposed to extend along the second direction D2. An opening direction of the push rod 120 is parallel to the third direction D3. The third direction D3 is respectively perpendicular to the first direction D1 and the second direction D2. In addition, as shown in FIG. 2 and FIG. 4, the driving module 140 may be slidably disposed in the second position limiting slot 124 of the push rod 120 via a screw rod 148, so that a sliding direction of the driving module 140 with respect to the push rod 120 is limited to the second direction D2.

The push rod 120 further has a third position limiting slot 126 disposed on the housing 10 along the first direction D1 as shown in FIG. 2. An opening direction of the third position limiting slot 126 is parallel to the second direction D2. In the embodiment, the unloading mechanism assembly 100 has a position limiting screw-locking member 182a, such as a position limiting screw. The position limiting screw-locking member 182a is disposed through the third position limiting slot 126 along the second direction D2 to movably screw the push rod 120 to the housing 10. By disposing the third position limiting slot 126, a sliding direction of the push rod 120 with respect to the position limiting screw-locking member 182a and the housing 10 may be limited to the first direction D1.

Figure 5:
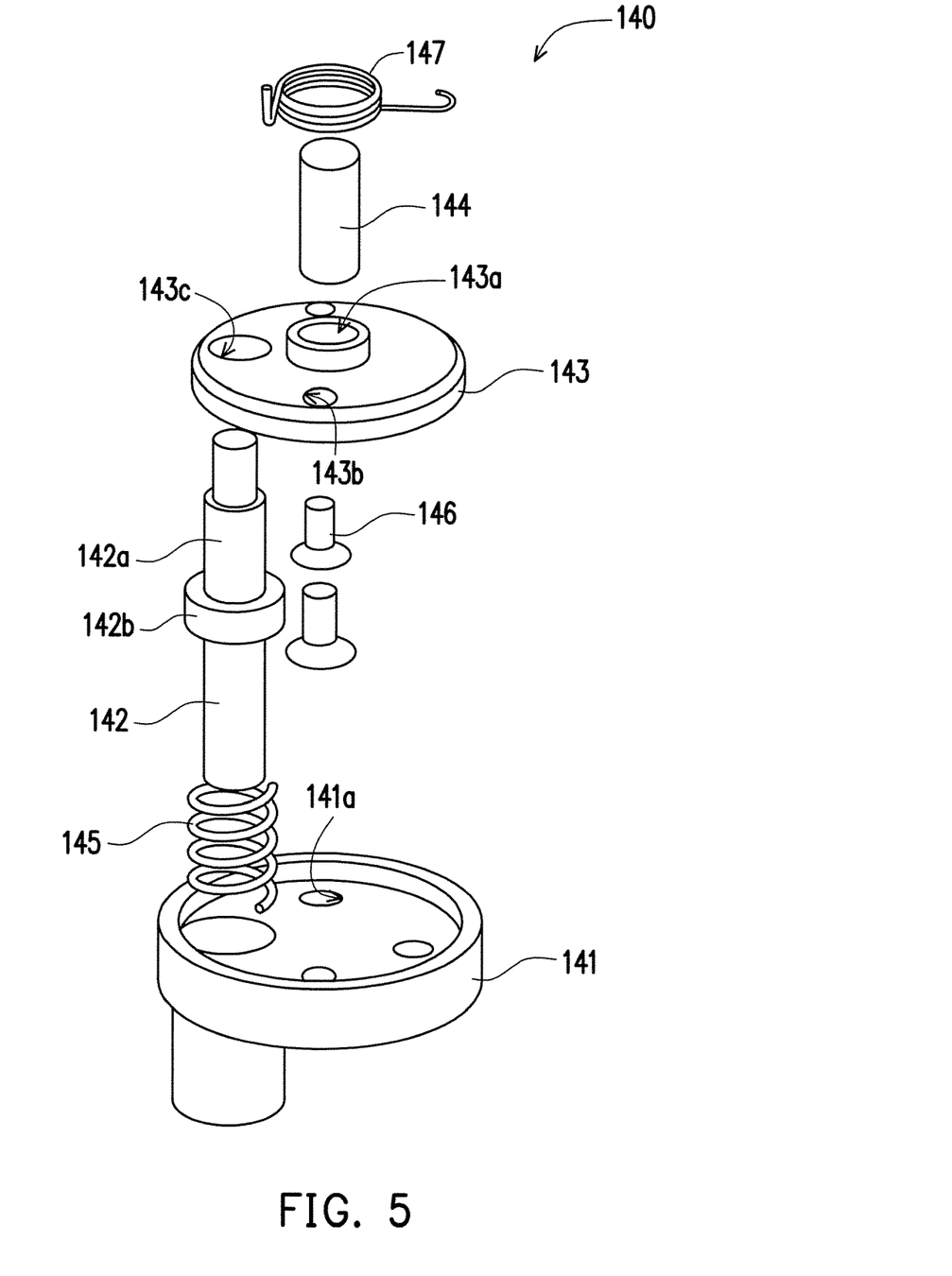
FIG. 5 is an exploded schematic view of a driving module of the unloading mechanism assembly of FIG. 1.

FIG. 5 is an exploded schematic view of a driving module of the unloading mechanism assembly of FIG. 1. Referring to FIG. 1, FIG. 2 and FIG. 5, the driving module 140 is coupled between the guiding component 110 and the push rod 120. In the embodiment, the driving module 140 includes a rotating pedestal 141, a rotating disk 143, the driving rod 142 and an elastic member 145. As shown in FIG. 2, the rotating pedestal 141 is coupled to the second position limiting slot 124 of the push rod 120 via the screw rod 148, and may slide with respect to the push rod 120 along the second direction D2. In addition, as shown in FIG. 5, the rotating disk 143 is disposed on the rotating pedestal 141. The driving rod 142 is eccentrically disposed through a via hole 143c of the rotating disk 143 along the third direction D3 in FIG. 2. In addition, as shown in FIG. 5, the elastic member 145 is disposed on the driving rod 142 and abuts against the rotating pedestal 141 and the rotating disk 143.

Further, the driving rod 142 of the embodiment may have a first annular projection portion 142a and a second annular projection portion 142b. The first annular projection portion 142a and the second annular projection portion 142b are sequentially disposed around a surface of the driving rod 142 along the third direction D3. The elastic member 145 may separately abut against the second annular projection portion 142b and the rotating pedestal 141.

As shown in FIG. 5, the driving module 140 further includes an axle body 144 and a torsion spring 147. The axle body 144 is disposed on a pivot pedestal 143a of the rotating disk 143 along the third direction D3. The torsion spring 147 is disposed on the axle body 144. Further, an end of the torsion spring 147 is fixed on a surface of the rotating disk 143 and may pivotally rotate with the rotating disk 143. In addition, the driving module 140 further has a plurality of fixing members 146 (only two fixing members are illustrated in FIG. 5 as an example). As an example, the fixing members 146 may be screws sequentially disposed through a first screw hole 141a of the rotating pedestal 141 and a second screw hole 143b of the rotating disk 143 to screw-lock the rotating disk 143 to the rotating pedestal 141.

Figure 6:
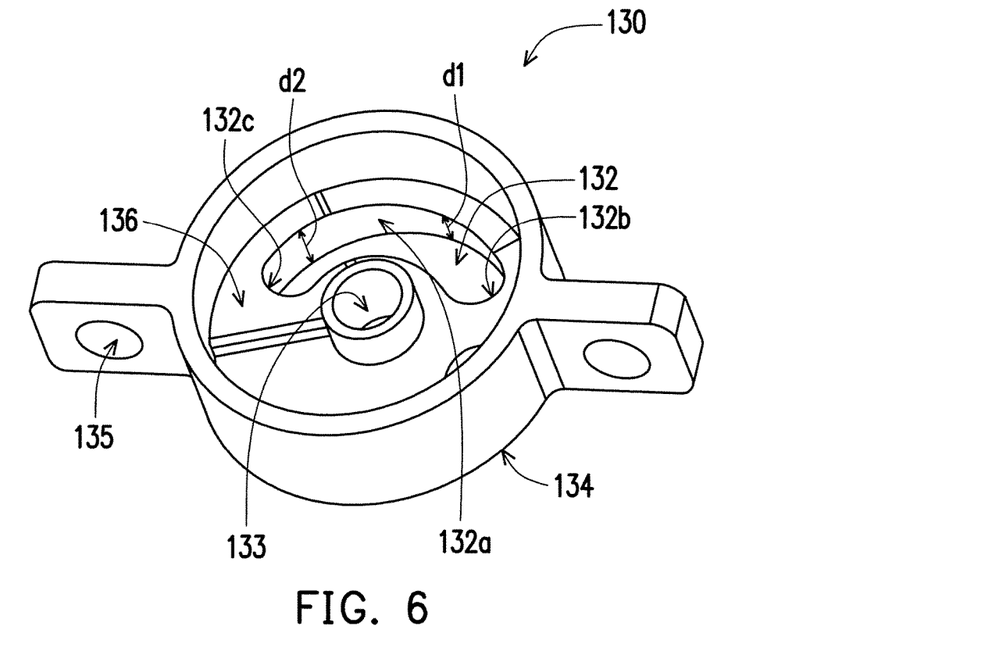
FIG. 6 is an enlarged schematic view of a stroke limiting pedestal of the unloading mechanism assembly of FIG. 1.

FIG. 6 is a schematic view of a stroke limiting pedestal of the unloading mechanism assembly of FIG. 1. Referring to FIG. 1, FIG. 2 and FIG. 6, as shown in FIG. 2, a stroke limiting pedestal 130 is disposed between the guiding component 110 and the driving module 140 and fixed to the housing 10 in the embodiment to limit a movement path of the driving rod 142 of the driving module 140. As shown in FIG. 6, the stroke limiting pedestal 130 has a first surface 134 and a second surface 136 opposite to each other and a position limiting groove 132 penetrating the first surface 134 and the second surface 136. The first surface 134 faces toward the guiding component 110 and an opening direction of the position limiting groove 132 is parallel to the third direction D3.

Referring to FIG. 6 again, the position limiting groove 132 is, for example, an arc-shaped groove. The position limiting groove 132 passes through a portion of the stroke limiting pedestal 130 and has a first end 132b and a second end 132c opposite to each other. A groove depth of the position limiting groove 132 may gradually increase from the first end 132b to the second end 132c. For instance, the groove depth of the position limiting groove 132 may gradually increase from a groove depth d1 near the first end 132b to a groove depth d2 near the second end 132c, as shown in FIG. 6. In other words, a groove wall 132a of the position limiting groove 132 is an inclined wall with respect to the first surface 134. In the embodiment, the driving rod 142 of the rotating disk 143 disposed through the driving module 140 may further pass through the position limiting groove 132 and be disposed through the first position limiting slot 112 of the guiding component 120. Further, the first annular projection portion 142a of the driving rod 142 may movably abut against the second surface 136 of the stroke limiting pedestal 130. The stroke limiting pedestal 130 has a via hole 133, and the axle body 144 disposed on the rotating disk 143 may be disposed through the via hole 133.

In detail, due to the difference in groove depth between the first end 132b and the second end 132c of the position limiting groove 132, a relative distance between the second surface 136 and the first surface 134 of the stroke limiting pedestal 130 also increases gradually in a direction from the first end 132b toward the second end 132c. Therefore, when the push rod 120 drives the driving module 140 to pivotally rotate in a clockwise direction, the driving rod 142 may be driven to slide from the first end 132b toward the second end 132c of the position limiting groove 132. Referring to FIG. 2, FIG. 5 and FIG. 6 again, during the sliding movement of the driving rod 142 along the position limiting groove 132, the second surface 136 is pressed against the first annular projection portion 142a of the driving rod 142 and thus drives the second annular projection portion 142b to press the elastic member 145 along the third direction D3 in FIG. 2. Consequently, the entire driving rod 142 is moved along the third direction D3 and along a direction away from the guiding component 110. Moreover, an end of the driving rod 142 originally disposed through the first position limiting slot 112 of the guiding component 110 gradually retracts into the position limiting groove 132 of the stroke limiting pedestal 130. Hence, a structure interference between the driving rod 142 and the first position limiting slot 112 is removed.

Referring to FIG. 2, FIG. 5 and FIG. 6, as the driving rod 142 approaches the second end 132c of the position limiting groove 132 shown in FIG. 6, the relative distance between the second surface 136 and the first surface 134 of the stroke limiting pedestal 130 gradually increases. In other words, the groove depth of the position limiting groove 132 gradually increases from the groove depth d1 to the groove depth d2 in FIG. 6 for example. Accordingly, the second surface 136 is pressed against and pushes the first annular projection portion 142a of the driving rod 142 shown in FIG. 5. Accordingly, a moving distance of the driving rod 142 along the third direction D3 as shown in FIG. 2 increases. Further, a compression amount that the second annular projection portion 142b in FIG. 5 compresses the elastic member 145 also gradually increases as the driving rod 142 moves. Referring to FIG. 2, with the above way of driving, one end of the driving rod 142 disposed through the first position limiting slot 112 of the guiding component 110 may be gradually moved in a direction away from the guiding component 110, so as to remove the structure interference between the driving rod 142 and the driving module 140 as well as the guiding component 110 and the optical disk drive 50.

Figure 7:
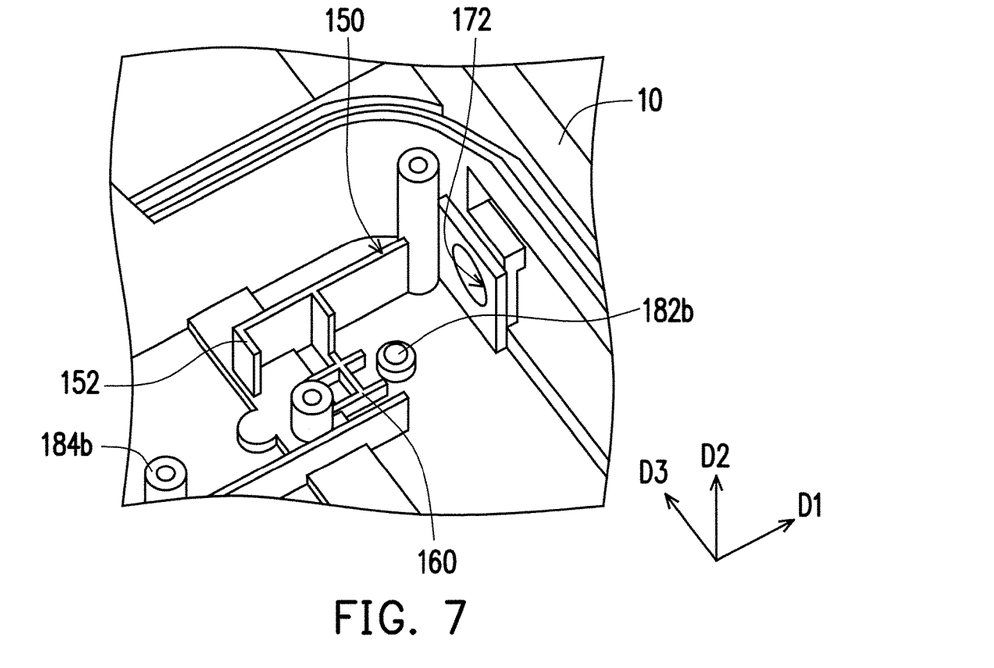
FIG. 7 is a schematic view of a portion of a housing of the electronic device of FIG. 1.

FIG. 7 is a schematic view of a portion of a housing of the electronic device of FIG. 1. Referring to FIG. 7, in the embodiment, the housing 10 may have a limiting structure 150 disposed at a side of the push rod 120 and extending along the first direction D1. The limiting structure 150 has at least one (two are illustrated in FIG. 7 as an example) position limiting rib 152 extending along the third direction D3, and abutting against the push rod 120 as shown in FIG. 2 to limit a position of the push rod 120 on the third direction D3. Further, as shown in FIG. 7, the housing 10 further has a slide rib 160 disposed on a surface of the housing 10 to prevent the push rod 120 from contacting the surface of the housing 10 and creating friction. Accordingly, a stroke of pushing the push rod 120 into the housing 10 is smoother.

In the embodiment, the unloading mechanism assembly 100 further has a screw 184a screw-locked to a second protruding column 184b on the housing 10 through lock holes 135 on sides of the stroke limiting pedestal 130 to screw-lock the stroke limiting pedestal 130 on the housing 10.

Figure 8A:
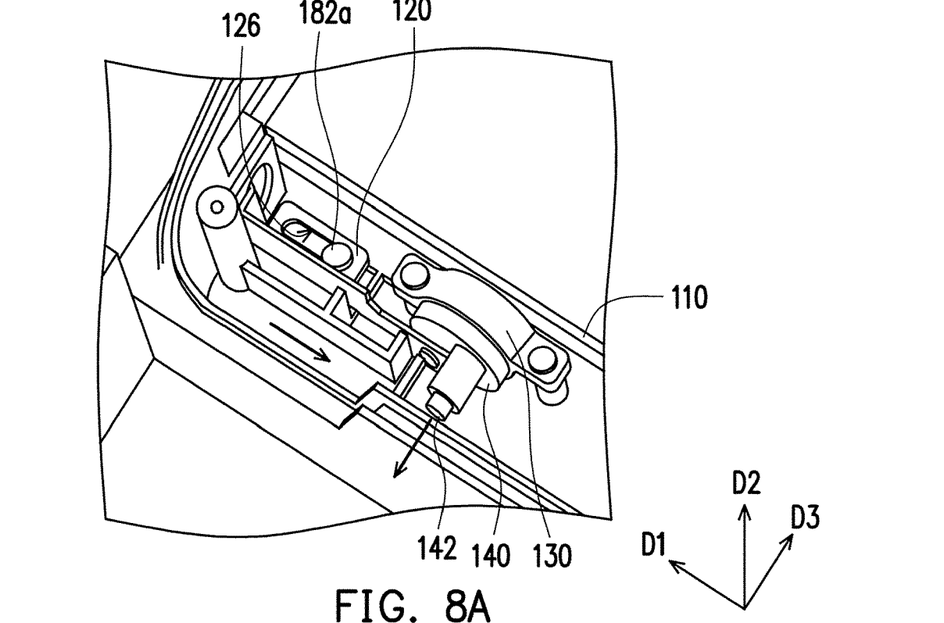
FIG. 8A, FIG. 8B and FIG. 8C are schematic views of an operation of an unloading mechanism assembly according to an embodiment of the invention.
Figure 8B:
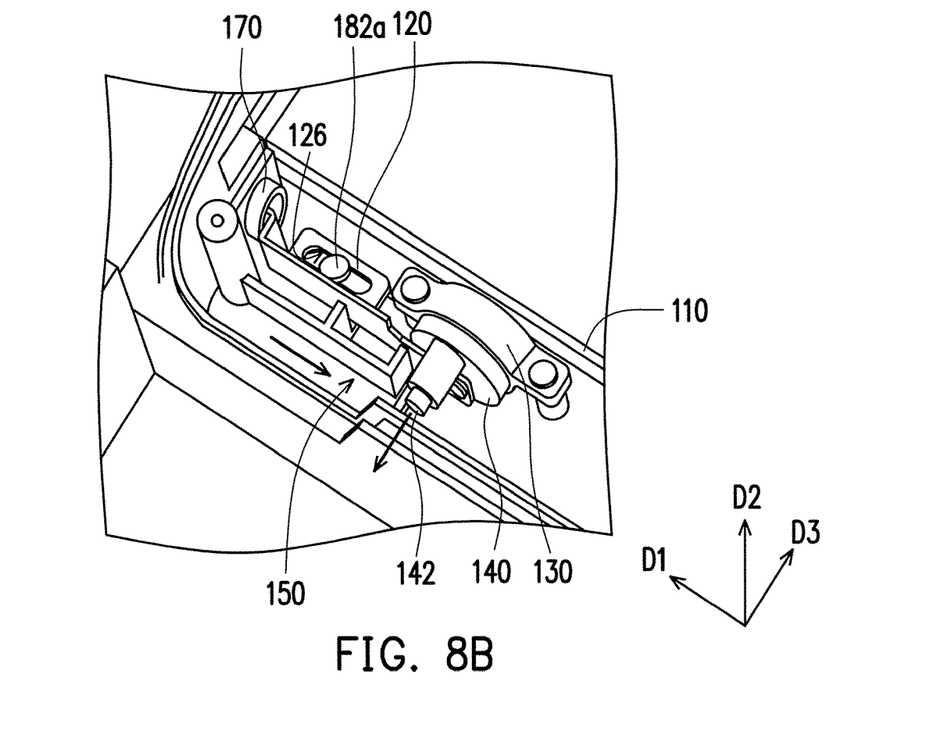
Figure 8C:
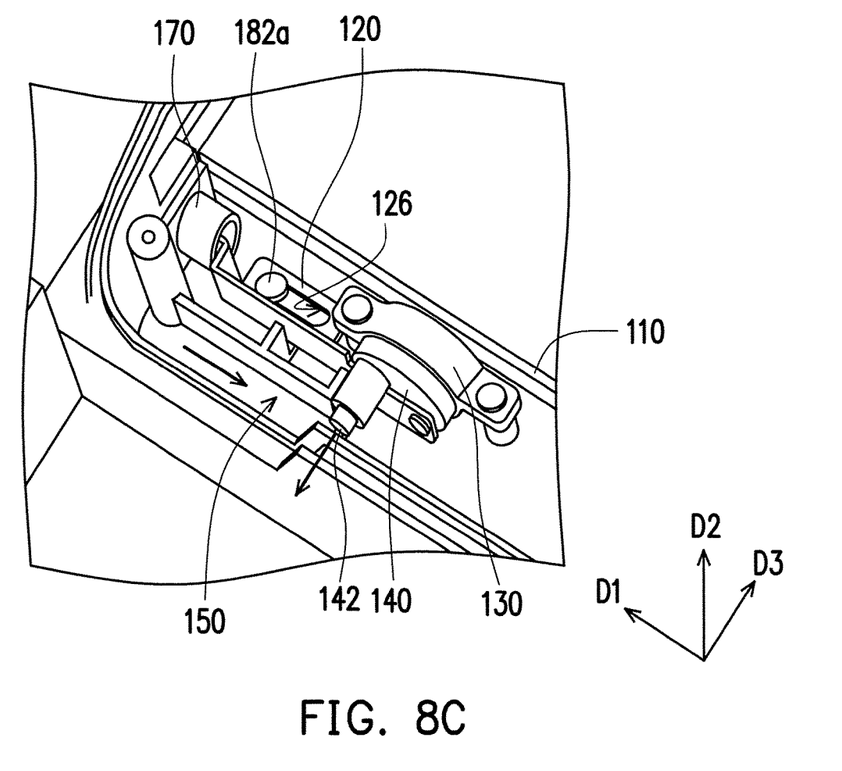
Figure 9A:
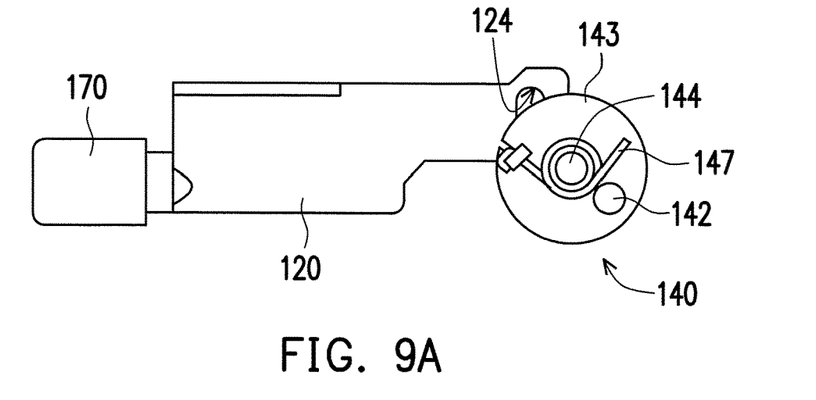
FIG. 9A, FIG. 9B and FIG. 9C are schematic views of an operation of a button, a push rod, and a driving module of FIG. 8A, FIG. 8B and FIG. 8C.
Figure 9B:
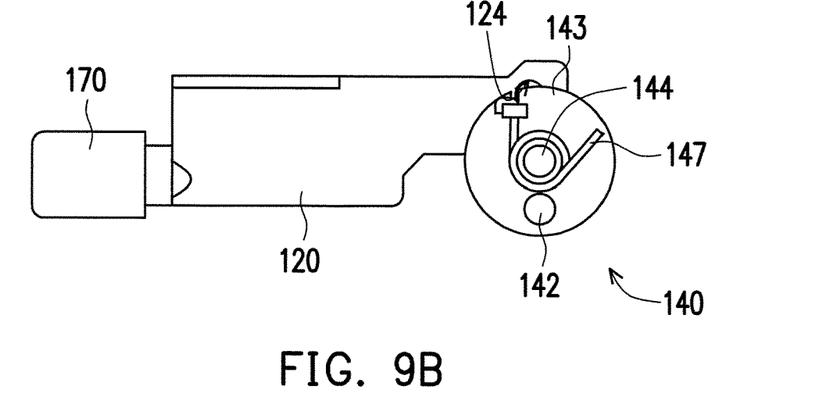
Figure 9C:
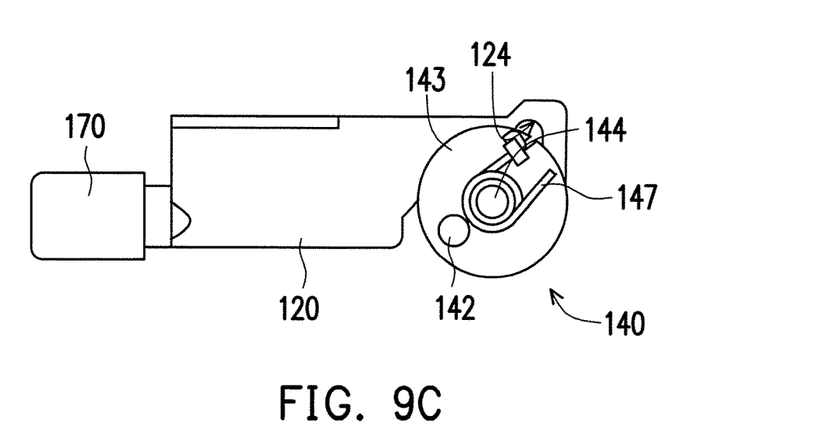

FIG. 8A, FIG. 8B and FIG. 8C are schematic views of an operation of an unloading mechanism assembly according to an embodiment of the invention. FIG. 9A, FIG. 9B and FIG. 9C are schematic views of an operation of a button, a push rod, and a driving module of FIG. 8A, FIG. 8B and FIG. 8C. Referring to FIG. 8A to FIG. 8C and FIG. 9A to FIG. 9C, in the embodiment, the unloading mechanism assembly 100 has a button 170 connected to an end of the push rod 120 exposed outside the housing 10. Further, a wall surface of the housing 10 has a through hole 172 corresponding to the button 170. Therefore, the button 170 may be pressed into the housing 10 from the outside of the housing 10.

As shown in FIG. 8A and FIG. 9A, in the embodiment, when a user presses the button 170, the button 170 may drive the push rod 120 to move along the first direction D1 toward the inside of the housing 10. Moreover, the push rod 120 may further drive the driving module 140 to pivotally rotate in a clockwise direction in FIG. 9A, thereby driving an end of the torsion spring 147 fixed on the rotating disk 143 to pivotally rotate toward the other end of the torsion spring 147. Thus, an included angle therebetween is reduced. Thus, the torsion spring 147 is provided with elastic potential energy when being compressed. Besides, the driving rod 142 may be driven by the rotating pedestal 141 and the rotating disk 143 to slide along the position limiting groove 132 of the stroke limiting pedestal 130. Referring to FIG. 5, FIG. 6 and FIG. 8A, the first annular projection portion 142a of the driving rod 142 shown in FIG. 5 is pressed by the second surface 136 of the stroke limiting pedestal 130 in FIG. 6. As shown in FIG. 8A, the stroke limiting pedestal 130 drives the driving rod 142 to move along the third direction D3 away from the guiding component 110.

As shown in FIG. 8B and FIG. 9B, when the button 170 is further pushed into the housing 10, the driving module 140 is further driven by the push rod 120 to pivotally rotate in a clockwise direction. In addition, the driving module 140 also slides vertically in the second position limiting slot 124 along the second direction D2 via the screw rod 148 disposed through the second position limiting slot 124. Moreover, the included angle between the end of the torsion spring 147 fixed on the rotating disk 143 and the other end of the torsion spring 147 is gradually reduced. Thus, the elastic potential energy stored in the torsion spring 147 gradually increases. Meanwhile, as shown in FIG. 5, FIG. 6 and FIG. 8B, an end of the driving rod 142 is also driven by the rotating pedestal 141 and the rotating disk 143 to further slide from the first end 132b to the second end 132c of the position limiting groove 132. Further, a movement distance of the first annular projection portion 142a of the driving rod 142 due to pressing of the second surface 136 of the stroke limiting pedestal 130 increases as the driving rod 142 gradually moves toward the second end 132c, and the entire driving rod 142 is driven to move a greater distance toward the third direction D3.

Referring FIG. 8C and FIG. 9C, as the button 170 is pushed into the housing 10 along the first direction D1 to have one end of the third position limiting slot 126 of the push rod 120 abut against the position limiting screw-locking member 182a screw-locked to a first convex column 182b (as shown in FIG. 7), the push rod 120 is unable to be further pushed into the housing 10. Meanwhile, the driving module 140 is no longer able to pivotally rotate in the clockwise direction through the driving of the push rod 120. Meanwhile, the end of the torsion spring 147 fixed on the rotating disk 143 is compressed to a minimum angle compressible with respect to the other end of the torsion spring 147. Thus, the torsion spring 147 has the maximum elastic potential energy. Further, the driving rod 142 is also driven by the rotating pedestal 141 and the rotating disk 143 to slide to the second end 132c of the position limiting groove 132. Meanwhile, the second surface 136 presses the driving rod 142 to move along the third direction D3 to a maximum movable distance, and drives the end of the driving rod 142 originally disposed through the first position limiting slot 112 to be completely separated from the guiding component 110. Thus, the structure interference between the driving rod 142 and the guiding component 110 is completely removed, and the optical disk drive 50 may be unloaded from the housing 10.

Figure 10A:
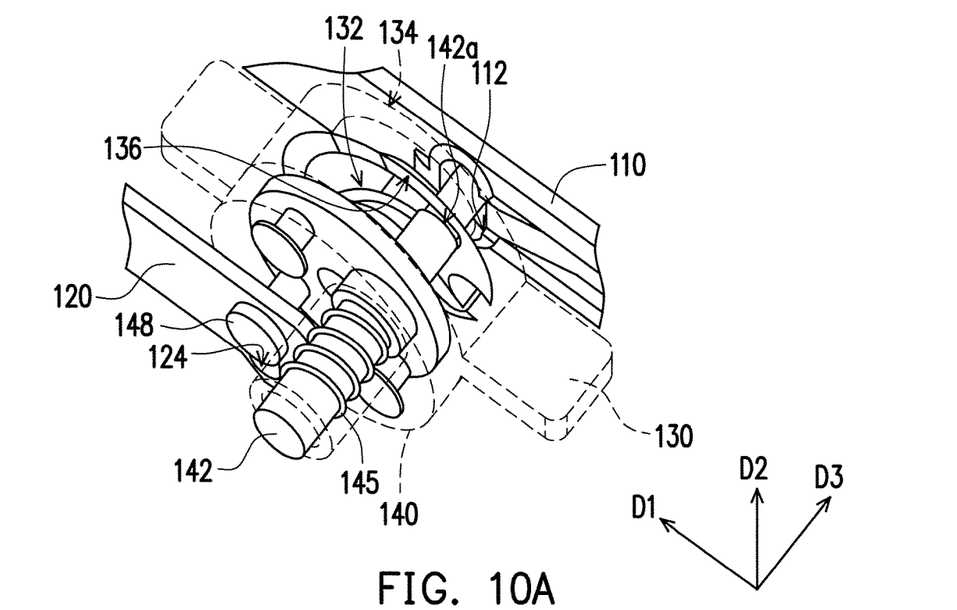
FIG. 10A, FIG. 10B and FIG. 10C are schematic views of an operation of a portion of components of an unloading mechanism assembly according to an embodiment of the invention.
Figure 10B:
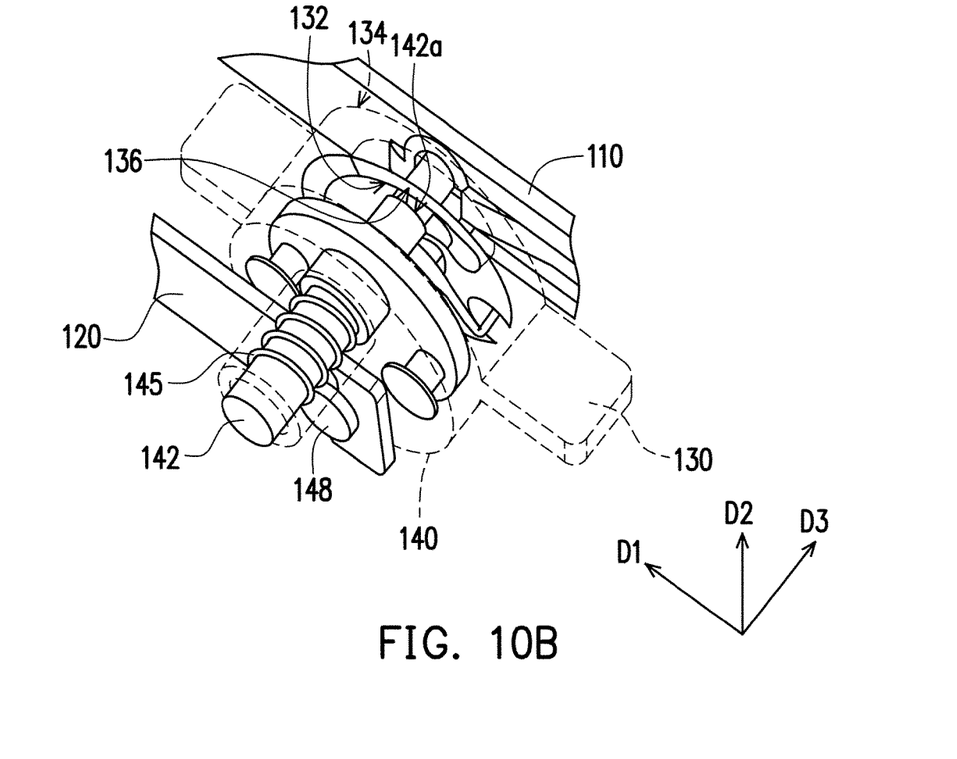
Figure 10C:
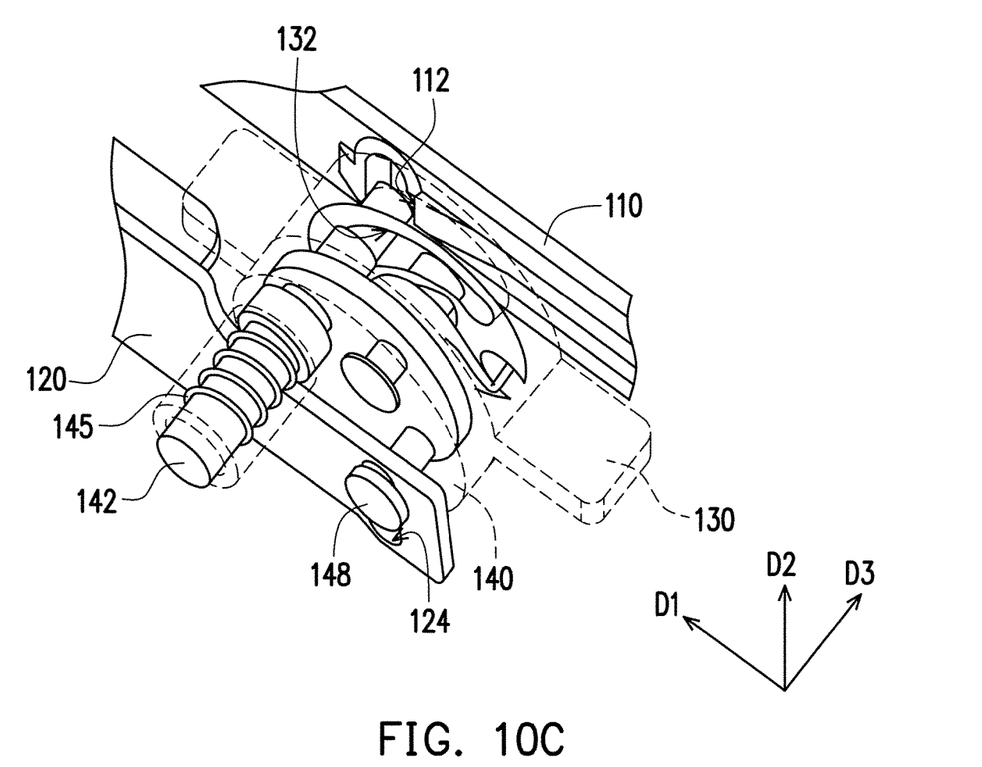

FIG. 10A, FIG. 10B and FIG. 10C are schematic views of an operation of a portion of components of an unloading mechanism assembly according to an embodiment of the invention. Referring to FIG. 8A to FIG. 8C, FIG. 9A to FIG. 9C and FIG. 10A to FIG. 10C, as shown in FIG. 8A, FIG. 9A and FIG. 10A, when the optical disk drive 50 is disposed in the housing 10, an end of the driving rod 142 of the driving module 140 may be disposed through the first position limiting slot 112 of the guiding component 110 to generate the structure interference between the driving rod 142 and the guiding component 110. Further, the driving rod 142 is driven by an elastic restoring force of the elastic member 145 to drive the first annular projection portion 142a of the driving rod 142 to abut against the second surface 136 of the stroke limiting pedestal 130.

As shown in FIG. 8B, FIG. 9B and FIG. 10B, when the user intends to unload the optical disk drive 50 from the housing 10, the user may press the button 170, so that the driving rod 142 is driven to slide along the position limiting groove 132 and move vertically along the first position limiting slot 112 in the second direction D2 when the push rod 120 connected to the button 170 is pushed along the first direction D1 and the driving module 140 is driven to rotate pivotally in the clockwise direction. When the driving rod 142 moves, the groove depth of the position limiting groove 132 (namely, the distance from the first surface 134 to the second surface 136) gradually increases, and the distance of the second surface 136 with respect to the first surface 134 also increases. Therefore, the second surface 136 may press the first annular projection portion 142a of the driving rod 142 along the third direction D3 to move the driving rod 142 and compress the elastic member 145 disposed on the driving rod 142. Accordingly, the elastic member 145 is provided with elastic potential energy.

As shown in FIG. 8C, FIG. 9C and FIG. 10C, when the driving module 140 further rotates pivotally to drive the driving rod 142 to slide to the second end 132c of the position limiting groove 132, and the first annular projection portion 142a of the driving rod 142 as shown in FIG. 5 is pressed by the second surface 136 of the stroke limiting pedestal 130 shown in FIG. 6, the stroke limiting pedestal 130 may drive an end of the driving rod 142 disposed through the first position limiting slot 112 of the guiding component 110 to be completely separated from the guiding component 110. Accordingly, there is no structure interference between the driving module 140 and the guiding component 110. Meanwhile, the elastic member 145 disposed on the driving rod 142 is also maximally compressed and has the maximum elastic potential energy. Since there is no further structure interference between the guiding component 110 locked to the optical disk drive 50 and the driving module 140, the optical disk drive 50 may be unloaded from the housing 10.

After the optical disk drive 50 is unloaded, the rotating disk 143 may drive, by the elastic potential energy stored through compression and released by the torsion spring 147, the rotating disk 143 to pivotally rotate to its original position and drive the driving rod 120 and the button 170 to return to their original positions. Further, the driving rod 142 releases the stored elastic potential energy by the elastic member 145 disposed on the driving rod 142 and moves to its original position along the third direction D3.

Figure 11A:
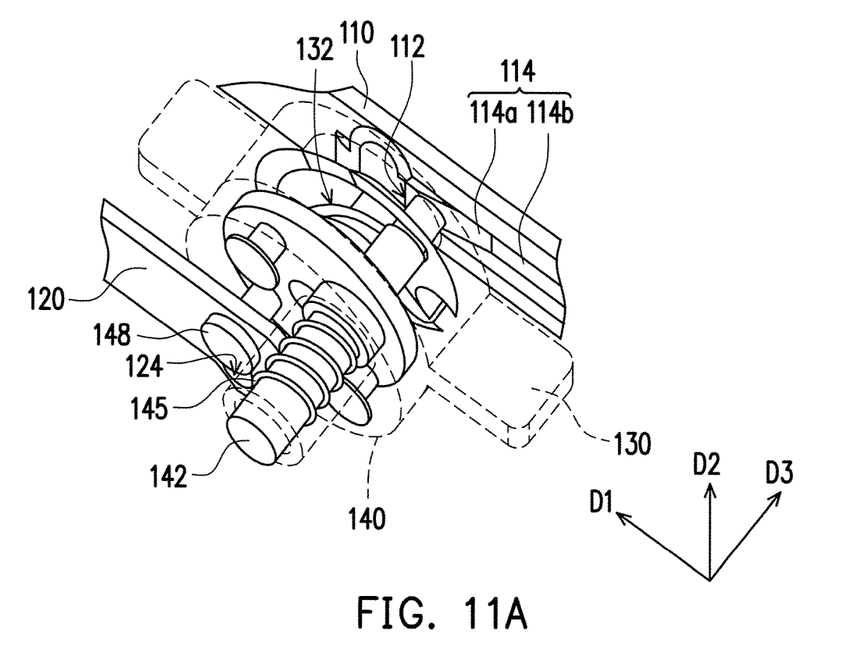
FIG. 11A and FIG. 11B are schematic views of another operation of an unloading mechanism assembly according to an embodiment of the invention.
Figure 11B:
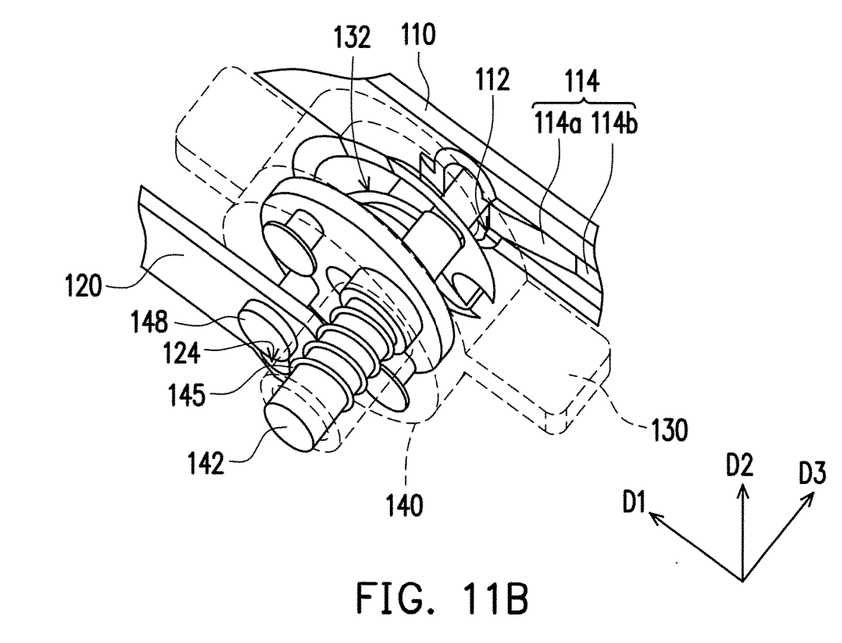

FIG. 11A and FIG. 11B are schematic views of another operation of an unloading mechanism assembly according to an embodiment of the invention. In the embodiment, when the optical disk drive 50 is placed into the housing 10, the guide rail 114 of the guiding component 110 locked to a side of the optical disk drive 50 may contact the driving rod 142 protruding from the driving module 140 first. Then, when the optical disk drive 50 is further pushed into the housing 10, the driving rod 142 moves along the flat portion 114b of the guide rail 114. Under the circumstance, there is no structure interference between the driving rod 142 and the flat portion 114b. As shown in FIG. 11A, when the optical disk drive 50 continues to move along the first direction D1 with respect to the driving rod 142 to have the inclined portion 114a of the guide rail 114 contact the driving rod 142, the inclined portion 114 may press an end of the driving rod 142 to drive the entire driving rod 142 away from the guiding component 110. Accordingly, the elastic member 145 disposed on the driving rod 142 generates the elastic potential energy as being pressed by the driving rod 142.

As shown in FIG. 11B, when the optical disk drive 50 is further pushed into the housing 10, an end of the driving rod 142 reaches a position corresponding to the first position limiting slot 112 across the inclined portion 114a of the guide rail 114. Under the circumstance, the elastic member 145 may release the elastic potential energy stored when being pressed by the inclined portion 114a. Driven by an elastic restoring force, an end of the driving rod 142 enters the first position limiting slot 112 of the guiding component 110, and the end of the driving rod 142 again enters and is disposed through the first position limiting slot 112. Thus, the structure interference is generated again between the driving rod 142 and the guiding component 110 to hold the optical disk drive 50 in the housing 10.

To sum up, in several embodiments of the invention, the push rod of the unloading mechanism assembly may drive the driving module to pivotally rotate so that the driving rod of the driving module may slide along the position limiting groove of the stroke limiting pedestal. When the driving rod slides along the position limiting groove, the second surface of the stroke limiting pedestal may press the driving rod to move the driving rod in a direction away from the guiding component and the optical disk drive, remove the structure interference between the driving rod and the guiding component, and consequently unload the optical disk drive from the housing of the electronic device. In several embodiments of the invention, the unloading mechanism assembly enables unloading of the optical disk drive by disposing a single button and the push rod. Thus, it is not required to additionally dispose excess buttons or openings on the housing of the electronic device, such as a notebook computer. Therefore, a risk of permeation of moisture into the housing is reduced, and a waterproof capability of the electronic device is enhanced.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:
1. An unloading mechanism assembly, adapted to unload an optical disk drive from a housing of an electronic device, the unloading mechanism assembly comprising:
   a guiding component, disposed at a side of the optical disk drive along a first direction and having a first position limiting slot, wherein the first position limiting slot extends along a second direction, and the first direction is perpendicular to the second direction;

a push rod, disposed in parallel with the guiding component along the first direction;

a driving module, coupled between the guiding component and the push rod and comprising a driving rod movably disposed through the first position limiting slot along a third direction respectively perpendicular to the first direction and the second direction, wherein the push rod is adapted to drive the driving module to pivotally rotate with respect to the guiding component, so as to drive the driving rod of the driving module to enter or to exit the first position limiting slot; and a stroke limiting pedestal, disposed between the guiding component and the driving module, fixed to the housing, and having a first surface and a second surface opposite to each other and a position limiting groove disposed through the first surface and the second surface, wherein the first surface faces toward the guiding component and an opening direction of the position limiting groove is parallel to the third direction.

2. The unloading mechanism assembly according to claim 1, wherein the position limiting groove has a first end and a second end opposite to each other, and a groove depth of the position limiting groove increases from the first end to the second end.

3. The unloading mechanism assembly according to claim 1, wherein the position limiting groove is an arc-shaped position limiting groove disposed through a portion of the stroke limiting pedestal.

4. The unloading mechanism assembly according to claim 1, wherein the driving module further comprises:

a rotating pedestal, coupled to the push rod along the third direction; and a rotating disk, disposed on the rotating pedestal, wherein the driving rod is movably disposed sequentially through the rotating pedestal, the rotating disk, the position limiting groove and the first position limiting slot along the third direction, and the driving rod has a first annular projection portion separately abutting against the second surface.

5. The unloading mechanism assembly according to claim 4, further comprising an elastic member disposed on the driving rod and abutting against the rotating pedestal and the rotating disk.

6. The unloading mechanism assembly according to claim 5, wherein the driving rod further has a second annular projection portion abutting against the rotating disk, and the elastic member abuts against the second annular projection portion and the rotating pedestal.

7. The unloading mechanism assembly according to claim 4, wherein the driving module further comprises an axle body and a torsion spring, the axle body is disposed on the rotating disk and extends along the third direction, and the torsion spring is disposed on the axle body.

8. The unloading mechanism assembly according to claim 1, wherein the guiding component further has a guide rail disposed at a side of the first position limiting slot and extending along the first direction.

9. The unloading mechanism assembly according to claim 8, wherein the guide rail has a flat portion and an inclined portion, the flat portion extends along the first direction to an end of the guiding component, and the inclined portion is disposed between the first position limiting slot and the flat portion and inclined with respect to the flat portion.

10. The unloading mechanism assembly according to claim 1, wherein the push rod has a second position limiting slot disposed along the second direction, and the driving module is slidably disposed on the second position limiting slot.

11. The unloading mechanism assembly according to claim 1, wherein the push rod has a third position limiting slot disposed on the housing along the first direction.

12. The unloading mechanism assembly according to claim 11, further comprising a position limiting screw-locking member, disposed through the third position limiting slot along the second direction to movably screw-lock the push rod to the housing, wherein the push rod is adapted to slide along the first direction with respect to the position limiting screw-locking member and the housing via the third position limiting slot.

13. The unloading mechanism assembly according to claim 1, wherein the guiding component has a plurality of lock holes, and the guiding component is locked to a side of the optical disk drive through the lock holes.

14. The unloading mechanism assembly according to claim 1, wherein the housing has a position limiting structure, disposed at a side of the push rod and extending along the first direction, the limiting structure has at least one position limiting rib, and the at least one position limiting rib extends toward the third direction and abuts against the push rod.

15. The unloading mechanism assembly according to claim 1, wherein the housing has at least one slide rib disposed on the housing and corresponding to a bottom of the push rod.

16. The unloading mechanism assembly according to claim 1, further comprising a button connected to an end of the push rod.

* * * * *